United States Patent [19]

DeLacy

[11] 4,164,773

[45] Aug. 14, 1979

[54] TRANSFER TRIP CIRCUIT WITH PILOT WIRE MONITORING

[75] Inventor: James P. DeLacy, Havertown, Pa.

[73] Assignee: Gould Inc., Rolling Meadows, Ill.

[21] Appl. No.: 883,304

[22] Filed: Mar. 3, 1978

[51] Int. Cl.² .............................................. H02H 7/26
[52] U.S. Cl. ..................................... 361/69; 361/115; 361/187; 361/191
[58] Field of Search ........................ 361/69, 70, 68, 64, 361/66, 50, 47, 48, 115, 37, 187, 191, 210; 340/638, 639, 652, 644, 147 R, 181; 307/130

[56] References Cited

U.S. PATENT DOCUMENTS

| | | | |
|---|---|---|---|
| 1,698,337 | 1/1929 | Leeson et al. | 361/69 |
| 1,953,108 | 4/1934 | Harder | 361/69 |
| 2,882,455 | 4/1959 | Ferguson, Jr. | 361/171 |
| 3,676,739 | 7/1972 | Neuhouser | 361/48 |
| 4,023,153 | 5/1977 | Adachi | 340/652 |

Primary Examiner—Patrick R. Salce
Attorney, Agent, or Firm—Ostrolenk, Faber, Gerb & Soffen

[57] ABSTRACT

A transfer trip circuit has a first station which contains a circuit breaker and a source of control current in which the control current is increased from a first value to a second value in response to the operation of the circuit breaker. A second station is connected to the first station by a pair of pilot wires which carry the control current. The second station contains a circuit breaker which is to be operated in response to the operation of the circuit breaker in the first station, and also contains two relay coils which carry the control current produced in the first station. The first relay coil operates an annunciator when the control current is below its first value to indicate a fault in the pilot wires. The second relay coil operates the trip circuit of the circuit breaker in the second station when the control current in said pilot wires is increased to said second value.

8 Claims, 2 Drawing Figures

TRANSFER TRIP CIRCUIT WITH PILOT WIRE MONITORING

BACKGROUND OF THE INVENTION

This invention relates to a transfer trip system for controlling the operation of a remotely located circuit breaker in response to the operation of a local circuit breaker, and more specifically relates to a transfer trip system in which an annunciator at the remote station can be operated only when the pilot wire connecting the two stations has developed a fault, without causing the operation of the remote circuit breaker.

Transfer trip systems are well known wherein a remote circuit breaker is tripped in response to the tripping of a local circuit breaker. Typically, the circuit breakers are operated by respective relaying systems which are connected to one another by a pair of pilot wires, which could, for example, be two miles long. A d-c source is provided for the transfer tripping operation, and an a-c source is provided to monitor the pilot wires for short circuits and open circuits. Complex relay schemes have been required to integrate the two sources. There is also the possibility that false tripping could be caused by transients in the pilot wires, especially when the pilot wires follow the same path as the protected line.

BRIEF DESCRIPTION OF THE INVENTION

In accordance with this invention, a single voltage source is applied to the pair of pilot wires. An adjustable impedance, controlled by fault sensing devices of the circuit breaker at the transmitting station, is connected in series with the voltage source such that, when none of the fault sensing devices are actuated, the impedance is in the pilot wire circuit and a given low current flows through the pilot wires and, when the fault sensing devices are actuated, the impedance is shorted and a given higher current flows through the pilot wires.

The remote receiving station contains a second circuit breaker which is to be tripped when the other breaker is tripped due to a fault. This remote station contains two relay coils connected in series with the pilot wires. The first relay coil actuates an annunciator when the pilot wire current decreases below the given low current. Thus, if the pilot wire is short-circuited or open-circuited somewhere along its length, the annunciator in the receiver station is operated.

The second relay coil actuates the tripping of the circuit breaker in the receiver station when the current in the pilot wires reaches its given high value, produced when the fault sensing devices in the transmitting station are actuated. Note that this does not actuate the annunciator relay, and that the second relay will not operate when pilot wire current decreases or goes to zero.

Consequently, the novel transfer system of the invention is operable with a single voltage source with high immunity against transients. Relatively low battery voltages can be used, where the voltage may vary in a wide range, for example, for 100 to 140 volts. The system of the invention uses few components, is easy to maintain, and will not cause a transfer trip operation in response to pilot wire short circuits or open circuits. Moreover, if there is a short circuit or open circuit on the pilot wires, an alarm will be sounded.

DETAILED DESCRIPTION OF THE DRAWINGS

Figure 1:
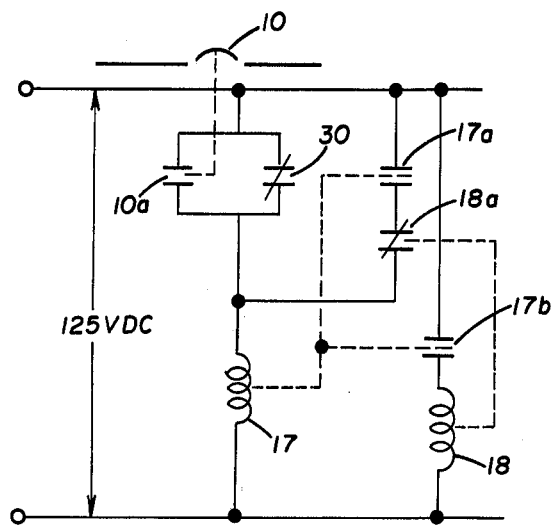
FIG. 1 is a schematic circuit diagram of the transfer trip relay system in the transmitting station which is associated with the circuit breaker.
Figure 2:
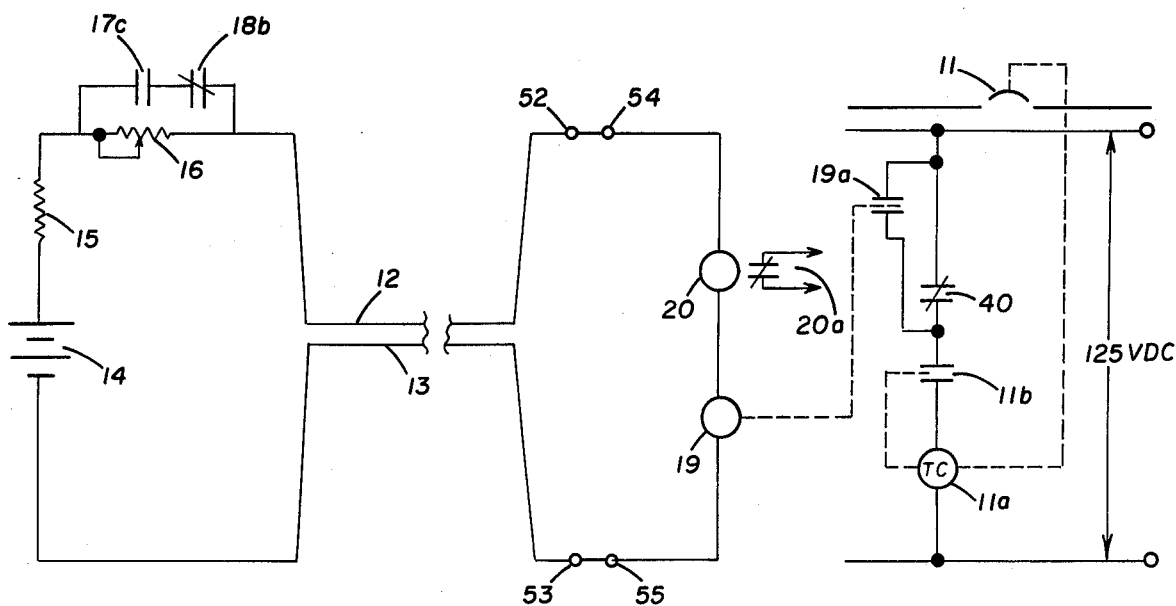
FIG. 2 is a schematic circuit diagram of the remaining transfer trip system including the pilot wires, relaying and receiving station.

Referring to the drawings, there is shown a first circuit breaker 10 in a first station (FIG. 1), and a second circuit breaker 11 in a second station (FIG. 2). The transfer trip system operates to transfer trip circuit breaker 11 whenever circuit breaker 10 is tripped because of a fault. In this way, the energized track zone, between circuit breakers 10 and 11 which contains the fault, is isolated.

The two stations are connected by a pair of pilot wires 12 and 13 which may be a #16 copper AWG shielded twisted pair. Wires 12 and 13 may typically be from 2,000 to 10,000 feet in length and have a resistance of from 10 to 100 ohms, respectively.

The wires 12 and 13 are connected, at the transmitting station, in the series circuit including battery 14, resistor 15, and rheostat 16. Battery 14 may be 125 volts d-c, but may vary from 100 volts d-c to 140 volts d-c. Resistor 15 may be a 100 ohm, 50 watt resistor, and rheostat 16 may be a 1500 ohm maximum, 25 watt device, and may be adjusted until 100 milliamperes are flowing in the pilot wire system.

The rheostat 16 of FIG. 2 is connected in parallel with a pair of series-connected contacts 17c and 18b which are associated with relay coils 17 and 18, respectively, of FIG. 1 as will be later described.

The opposite ends of wires 12 and 13 are connected to the remote station containing circuit breaker 11 and are in series with relay coils 19 and 20. Relay coil 19 controls a contact 19a and is adjusted such that contact 19a is closed when the current in pilot wires 12 and 13 is increased to a relatively high value due to the short circuiting of rheostat 16 by the closing of both contacts 17c and 18b. Typically, this relatively high current may be about 400 milliamperes.

Relay coil 20 which is normally always energized is associated with an annunciator system or alarm which is operated in response to the closing of contact 20a. Relay coil 20 is energized by the nominal relatively low current (typically 100 milliamperes) in wires 12 and 13 when the rheostat 16 is in the circuit. However, if the current in wires 12 and 13 decreases below 100 milliamperes, as due to an open circuit or short circuit in wires 12 and 13, the contact 20a, which is held open when the coil 20 is energized, will close and the annunciator or alarm is operated.

The relay scheme of FIGS. 1 and 2 includes relay coils 17, 18, 19 and 20, and their respective contacts which are shown as either normally open or normally closed contacts.

Relay 17 is associated with normally open contacts 17a, 17b, and 17c. Relay 17 may be a Relay Type LJ, high speed relay made by Relay Associates Inc.

Relay 18 is associated with normally closed contacts 18a and 18b and is a 0.5 to 5 second timing relay, and may be a Type 7012 relay, Part No. 7012PB, made by Agastat.

Relay 19 has normally open contact 19a associated therewith, and has a 6 volt, 16 ohm coil which has a pick-up current of about 290 milliamperes and a drop-out current greater than about 129 milliamperes. Relay 19 may be a Type 219, Part No. 219DXX102 relay made by Struthers-Dunn, Inc.

Relay 20 has normally closed contact 20a associated therewith, and has a 12 volt, 120 ohm coil, with a pick-up current of 100 milliamperes. Relay 20 may be Type A283, Part No. A283XBXC, made by Struthers-Dunn Inc.

Circuit breaker 10 has a momentary close contact 10a associated therewith, wherein contact 10a is momentarily closed for 10 milliseconds when the circuit breaker 10 is tripped on a fault.

An undervoltage relay is provided in the track between circuit breakers 10 and 11, and this relay has a normally closed contact 30 which closes if an undervoltage condition exists on the track.

At the receiving station, circuit breaker 11 is provided with a trip coil 11a which is in series with a contact 11b which is normally open when the breaker 11 is open, and which closes when circuit breaker 11 is closed.

The receiving station contains other relay contacts, as desired, including relay contact 40 in the tripping circuit of circuit breaker 11. Contact 40 is arranged to open just before breaker 11 receives a closing signal, either from a voltage sensing circuit or load measuring circuit for breaker 11 (not shown).

This contact allows breaker 11 to be closed when both ends of the wire are de-energized, but no fault exists.

The operation of the circuit of FIGS. 1 and 2 is as follows:

Assume that breakers 10 and 11 are closed. The control voltage, for example, 125 volts d-c is applied across contact 10a which is open and contact 30 which is open since there is no undervoltage condition. Therefore, coil 17 is de-energized and contacts 17a, 17b and 17c are open. Since contact 17b is open, coil 18 is not energized, and contacts 18a and 18b are closed.

As seen in FIG. 2, since contact 17c is open, the resistance of rheostat 16 is in the series circuit including battery 14, resistor 15, rheostat 16, wire 12, coil 20, coil 19 and wire 13, back to battery 14. The resistance of rheostat limits the current in this circuit to about 100 milliamperes, which is high enough to energize coil 20, and to open annunciator contact 20a, thereby to disable the annunciator or alarm signal operated when contact 20a closes. However, the current is too low to energize coil 19, which requires about 290 milliamperes to close the open contact 19a which remains open.

Assume now that a fault occurs which is greater, for example, than 12,000 amperes, and that the overcurrent trip mechanism of circuit breaker 10 trips the associated breaker 10. It is now desired, also to trip breaker 11, to isolate the line between breakers 10 and 11. The tripping of breaker 10 causes contact 10a to close for ten milliseconds. This causes current flow into coil 17 to cause contacts 17a, 17b and 17c to close. The closing of contact 17b allows energization of coil 18 which, after a given delay of from 0.5 to 5 seconds, causes contacts 18a and 18b to open.

When contact 17c closes, the contact 18b is still closed, and rheostat 16 is short circuited; also contact 17a seals in the coil 17. The shorting of rheostat 16 permits the current in the pilot wires 12 and 13 to increase to the value needed to energize coil 19 and close contact 19a. Note that coil 20, which is used to monitor a fault in the pilot wires, is unaffected by this increase in current through the pilot wire circuit.

The closing of contact 19a causes current flow from the 125 volt d-c control voltage source shown, through contact 19a, contact 11b (which is closed when breaker 11 is closed) and trip coil 11a. Trip coil 11a is then energized and trips breaker 11.

After a given time delay of from 0.5 to 5 seconds, contact 18a opens to break the seal-in of coil 17, and contact 18b opens to insert rheostat 16 back into the pilot wire circuit. Coil 19 is then de-energized (but not coil 20), and contact 19a opens.

Note that the sequence of operation given above can be initiated by closing the contact 30 in response to an undervoltage condition.

The novel circuit of FIGS. 1 and 2 also monitors the condition of pilot wires 12 and 13 without causing the tripping of breaker 11, and with few components. Thus, if there is an open circuit or short circuit anywhere along the length of the pilot wires 12 and 13 or anywhere in the transmitting or receiving circuit, the circuit current will reduce below the drop-out current of coil 20, and annunciator contact 20a will close to sound an alarm.

Finally, this circuit is designed so that the voltage which is remotely obtained is normally at such a low value that a potential hazard to humans is reduced to a minimum. The voltage across relays 19 and 20, combined, is nominally less than 15 volts. This voltage will not cause dangerous shock to an individual who happens to come across it. Moreover, if it is required to replace either relay 19 or relay 20, terminal points 52–53 and 54–55, respectively, may be shorted and there is then essentially no voltage drop at this location. Either relay may be changed and then the short may be removed without any problem of electric shock.

Although a preferred embodiment of this invention has been described, many variations and modifications will now be apparent to those skilled in the art, and it is preferred therefore that the instant invention be limited not by the specific disclosure herein but only by the appended claims.

I claim:

1. A transfer trip system for tripping a remote circuit breaker in response to the tripping of a local circuit breaker due to a fault; said transfer tripping circuit comprising first contact means coupled to said local circuit breaker, and operable from an open position to a closed position in response to the opening of said local circuit breaker; a pair of parallel pilot wires having respective first ends disposed near said local circuit breaker, and respective second ends disposed near said remote circuit breaker; a series-connected pilot wire voltage source and resistor means connected in series with said first ends of said pair of pilot wires; said first contact means connected in parallel with said first resistor means; a first coil and second coil means connected in series with one another and with said second ends of said pair of pilot wires; said first coil being connected to alarm means, and operating said alarm means when the current in said first coil is lower than a first value; said second coil being coupled to said remote circuit breaker, and being operable to trip said remote circuit breaker when the current therethrough exceeds a second current value; said pilot wires carrying a current which is above said first current value and below said second current value when said first contact means is open, and carrying a current which is above said second current value when said first contact means is closed.

2. The system of claim 1 which further includes normally closed second contact means in series with said first contact means; and operating means for said second contact means for opening said second contact means with a given time delay after the closing of said first contact means.

3. The system of claim 1 wherein said first contact means includes coil means and first, second and third normally open coil contacts operated by said coil means, and a normally open circuit breaker fault indicating contact in series with said coil means; said first coil contact connected in parallel with said circuit breaker contact and in series with said coil.

4. The system of claim 2 wherein said first contact means includes coil means and first and second normally open coil contacts operated by said coil means, and a normally open circuit breaker fault indicating contact in series with said coil means; said first coil contact connected in parallel with said circuit breaker contact and in series with said coil; said operating means comprising a second coil; said second coil contact being connected in series with said second coil.

5. The system of claim 1 wherein said pilot wires consist of a twisted pair having a length greater than about 2,000 feet.

6. The system of claim 4 wherein said pilot wires consist of a twisted pair having a length greater than about 2,000 feet.

7. The system of claim 3 which further includes a normally closed undervoltage relay contact in parallel with said circuit breaker contact.

8. The method of monitoring the pilot wires of a transfer trip system comprising the steps of applying a current to the pilot wires which has a current valve high enough to operate an annunciator relay to hold inoperative an alarm, but too low to operate a remote circuit breaker trip coil; and short circuiting a resistor in the pilot wires in response to the tripping of a local circuit breaker due to a fault to increase the pilot wire current sufficiently to operate said remote circuit breaker trip coil, and whereby said current in said pilot wires decreases to a sufficiently low value to de-energize said annunciator relay and cause operation of said alarm when a short circuit or open circuit exists in said pilot wires.

* * * * *